United States Patent
Mei

(10) Patent No.: US 6,487,055 B1
(45) Date of Patent: Nov. 26, 2002

(54) POSITIVE COUPLING OF PIEZOELECTRIC DEVICES IN DISK DRIVE SUSPENSIONS

(75) Inventor: Shijin Mei, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 10/001,481

(22) Filed: Nov. 1, 2001

Related U.S. Application Data

(63) Continuation of application No. 09/747,387, filed on Dec. 21, 2000, now Pat. No. 6,335,848, which is a continuation of application No. 09/342,684, filed on Jun. 29, 1999, now Pat. No. 6,278,587.
(60) Provisional application No. 60/130,578, filed on Apr. 21, 1999.

(51) Int. Cl.[7] .............................................. G11B 21/18
(52) U.S. Cl. ................................................... 360/294.4
(58) Field of Search ............................ 360/294.1–294.6

(56) References Cited

U.S. PATENT DOCUMENTS

| | | | | |
|---|---|---|---|---|
| 5,764,444 A | * | 6/1998 | Imamura et al. ......... | 360/294.4 |
| 6,002,549 A | * | 12/1999 | Berman et al. .......... | 360/294.4 |
| 6,025,975 A | * | 2/2000 | Fard et al. ................ | 360/294.4 |
| 6,157,522 A | * | 12/2000 | Murphy et al. .......... | 360/294.4 |
| 6,188,548 B1 | * | 2/2001 | Khan et al. ............... | 360/294.4 |
| 6,233,124 B1 | * | 5/2001 | Budde et al. ............. | 360/294.4 |
| 6,239,953 B1 | * | 5/2001 | Mei ......................... | 360/294.4 |
| 6,249,064 B1 | * | 6/2001 | Bradbury ................. | 360/294.4 |
| 6,268,983 B1 | * | 7/2001 | Imada et al. ............. | 360/294.4 |
| 6,320,730 B1 | * | 11/2001 | Stefansky et al. ........ | 360/294.4 |
| 6,331,923 B1 | * | 12/2001 | Mei ......................... | 360/294.4 |
| 6,335,848 B1 | * | 1/2002 | Mei ......................... | 360/294.4 |
| 6,335,849 B1 | * | 1/2002 | Khan et al. ............... | 360/294.4 |

* cited by examiner

Primary Examiner—Allen Cao
(74) Attorney, Agent, or Firm—Louis J. Bachand

(57) ABSTRACT

A disk drive suspension and method uses microactuators comprising piezoelectric crystals to drive movement of the load beam beam portion relative to the load beam base portion to shift the beam portion carrying a slider relative to disk tracks by having the load beam portions and the crystals positively coupled to load beam projecting parts extending into the perimeter of the crystals.

11 Claims, 5 Drawing Sheets

POSITIVE COUPLING OF PIEZOELECTRIC DEVICES IN DISK DRIVE SUSPENSIONS

REFERENCE TO RELATED APPLICATIONS

This application is a continuation of application Ser. No. 09/747,387 filed Dec. 21, 2001, now U.S. Pat. No. 6,335,848 which is a continuation of application Ser. No. 09/342,684, filed Jun. 29,1999, now U.S. Pat. No. 6,278,587, which application claims the benefit of U.S. Provisional Application Serial No. 60/130,578 filed Apr. 21,1999.

BACKGROUND OF THE INVENTION

1. Field of the Invention

This invention relates to disk drive suspensions, and more particularly to disk drive suspensions comprising a load beam actuated to different disk tracks by a microactuator. In the invention, the microactuator typically comprises a piezoelectric crystal that that is electrodynamic to expand or contract responsive to an input of a voltage. This phenomenon enables micro adjustment of the position of the load beam rigid portion carrying the slider relative to the disk for reading or writing data. In a specific aspect, the invention relates to improvements in the coupling of the microactuator to the load beam for the microactuation movement.

2. Related Art

Microactuation of load beams with piezoelectric crystals has relied on adhesive bonding. In many cases there is insufficient real estate on the opposing load beam portion surfaces and the piezoelectric crystal surfaces to deposit the quantity of adhesive needed to bond the parts against the forces encountered in use of the suspension.

SUMMARY OF THE INVENTION

It is an object of the invention to provide an improved assembly of a load beam and microactuator. It is a further object to provide a combination load beam and microactuator positively coupled together by interfitting elements of the load beam and microactuator. It is another object to provide a method of assembling a load beam with a microactuator piezoelectric crystal by increasing the opposing surfaces of the parts and bonding the parts with adhesive. It is a highly particular object to provide interfitting receiving and inserting structures on the microactuator and load beam such as notches and holes that positively couple corresponding structure such as tabs, rails, pins, and the like.

These and other objects of the invention to become apparent hereinafter are realized in a disk drive suspension comprising a load beam having a base portion, a spring portion, and a beam portion adapted to carry a slider in operating proximity to a disk, and a dimensionally variable electrodynamic microactuator, the load beam and microactuator defining cooperating interfitting structures, the microactuator acting through the interfitting structures being arranged to selectively displace the beam portion relative to the base portion.

In this and like embodiments, typically, the load beam and microactuator are bonded together at the interfitting structures, the microactuator comprises a piezoelectric crystal, the crystal extending in a plane and defining an interfitting structure comprising at least receiving element, the load beam extending in a plane generally parallel to the crystal plane and defining an interfitting structure comprising at least insertion element, the receiving and insertion elements cooperating in interfitting relation to interlock the crystal and the load beam in shear in their planes, the microactuator comprises a piezoelectric crystal, and the suspension includes right and left hand microactuators acting from the base portion on the beam portion in displacing relation.

In another embodiment, the invention provides a disk drive suspension comprising a load beam having a base portion, a spring portion, and a beam portion adapted to carry a slider in operating proximity to a disk, and a dimensionally variable electrodynamic microactuator, interfitting male and female structures defined by the load beam and microactuator, the microactuator acting through the interfitting male and female structures being arranged to selectively displace the beam portion relative to the base portion.

In this and like embodiments, typically, the microactuator comprises a piezoelectric crystal, the piezoelectric crystal having notches inward from an edge at longitudinally spaced proximate and distal locations along the edge to define the female structure, the load beam base portion defining a first male structure interfitting the proximately located notch, the load beam rigid portion defining a second male structure interfitting the distally located notch, the microactuator comprises a piezoelectric crystal, the piezoelectric crystal having notches inward from its left and right edges at longitudinally spaced, opposed proximate and distal locations to define the female structure, the load beam base portion defining opposed, laterally spaced first male structures interfitting the proximately located notches, the load beam rigid portion defining opposed, laterally spaced second male structures interfitting the distally located notches, the notches are generally rectangular and transverse to the long axis of the piezoelectric crystal, the first and second male structures being generally congruent with the notches, the first and second male structures comprise bent up tabs from on the respective load beam portions, the first and second male structures extend transversely of their respective load beam portions and in parallel with each other, the first and second male structures extending transversely an extent greater than the transverse extent of the notches so that the male structures project laterally from the piezoelectric crystal notches in their interfitted condition.

In this and like embodiments, further, the microactuator comprises a piezoelectric crystal, the piezoelectric crystal having apertures inward from an edge at longitudinally spaced proximate and distal locations along the length of the crystal to define the female structure, the load beam base portion defining a first male structure interfitting the proximately located aperture, the load beam rigid portion defining a second male structure interfitting the distally located aperture, the microactuator comprises a piezoelectric crystal, the piezoelectric crystal having apertures inward from its left and right edges at longitudinally spaced, opposed proximate and distal locations to define the female structure, the load beam base portion defining opposed, laterally spaced first male structures interfitting the proximately located apertures, the load beam rigid portion defining opposed, laterally spaced second male structures interfitting the distally located apertures, the apertures are generally rectangular and transverse to the long axis of the piezoelectric crystal, the first and second male structures being generally congruent with the apertures, the first and second male structures comprise bent up tabs from on the respective load beam portions, the apertures are tapered down in the direction of insertion of the male structures.

In yet a further embodiment the microactuator comprises a piezoelectric crystal, the piezoelectric crystal having generally rounded holes between its edges at longitudinally spaced proximate and distal locations to define the female structure, the load beam base portion defining a first male structure interfitting the proximately located hole, the load beam rigid portion defining a second male structure interfitting the distally located hole.

Yet further, the microactuator comprises a piezoelectric crystal, the piezoelectric crystal having generally rounded first and second holes on its longitudinal axis at longitudinally spaced, opposed proximate and distal locations to define the female structure, the load beam base portion defining a first male structure interfitting the proximately located first hole, the load beam rigid portion defining a second male structure longitudinally spaced from the first male structure and interfitting the distally located hole, the holes are circular, the first and second male structures each having a generally conical base generally congruent with its the hole in hole engaging relation to couple the piezoelectric crystal to the load beam portion, the first and second male structures comprise projections from the respective load beam portions, the first and second male structures extend in parallel with each other, the first and second male structures extending normal to the plane of their respective load beam portions an axial extent less than the axial extent of the holes in their interfitted condition, the first and second male structures projections are formed by etching away load beam portion areas surrounding the projections, or the first and second male structure projections are formed by deflecting the load beam portions about a forming tool.

In its method aspects the invention provides a method of bonding a load beam and a piezoelectric crystal having opposing surfaces, including reshaping the crystal surface to increase its area opposite the load beam, reshaping the load beam opposing surface to increase its area, applying adhesive to at least one of the opposing surfaces, and bonding the opposing surfaces together with the adhesive.

BRIEF DESCRIPTION OF THE DRAWINGS

The invention will be further described in conjunction with the attached drawings in which.

DETAILED DESCRIPTION

Figure 1:
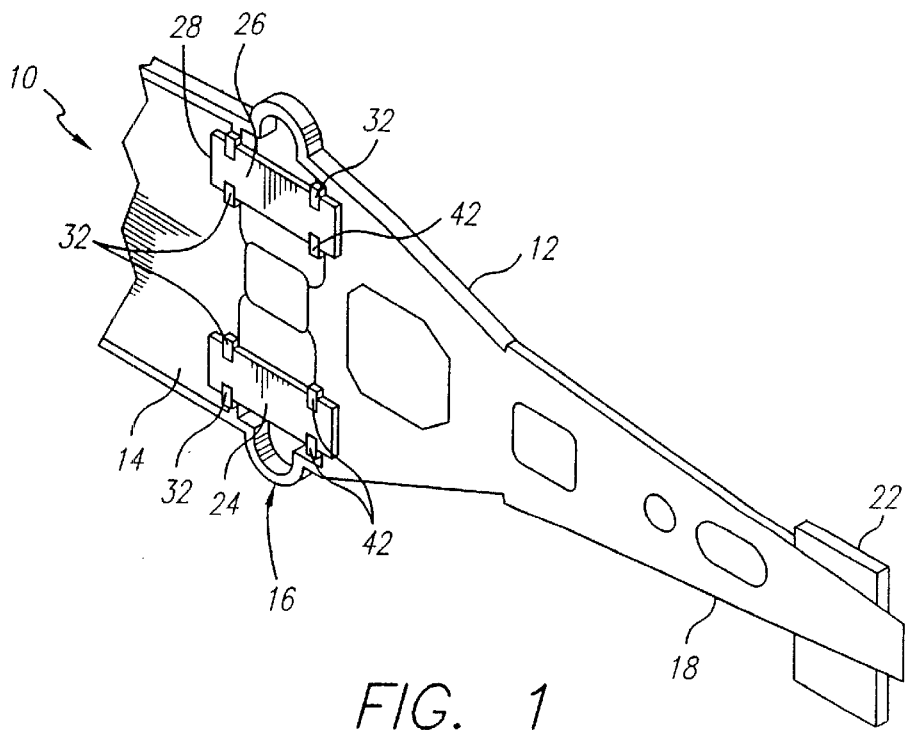
FIG. 1 is an oblique view of a first embodiment of the invention suspension.
Figure 2:
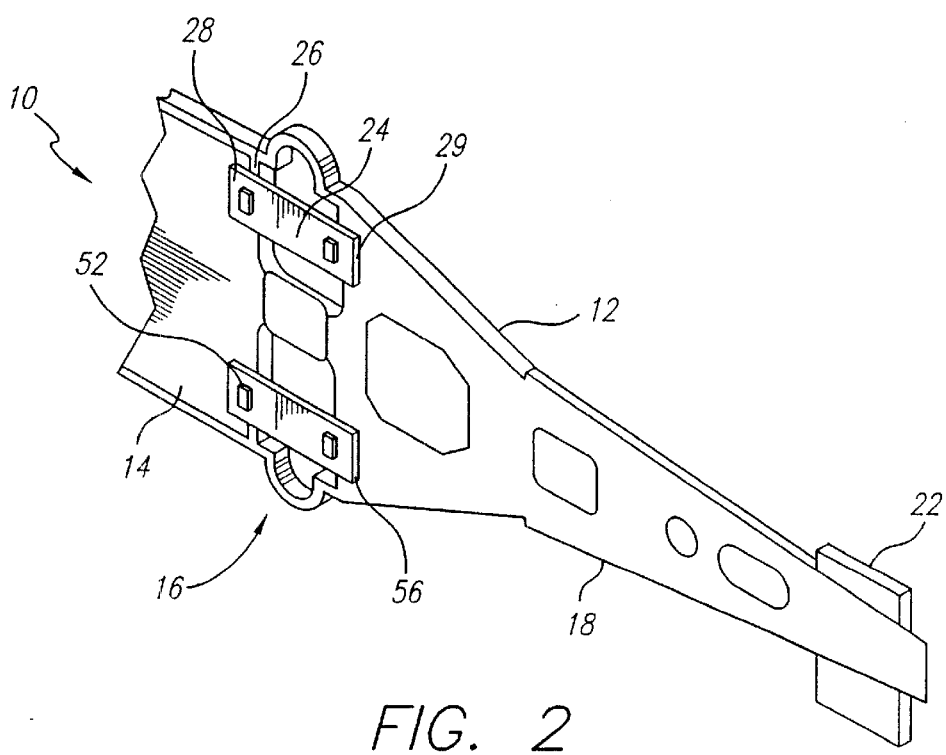
FIG. 2 is an oblique view of a second embodiment of the invention.

Use of piezoelectric ceramic material-based microactuator in the dual stage hard disk drives gives higher tracking performance as a function of expansion and contraction of the piezoelectric crystal under an applied voltage. A suitable piezoelectric bond area is found in the openings between the load beam spring area and the mount plate. The microactuator stroke realized is proportional to the length of the opening. There is a limit on the length of the opening due to other design considerations such that the opening length is typically less than 0.140 inch. To produce enough head lateral stroke (20000 track per inch) the piezoelectric opening length needs to be at least 0.120 inch, with high $d_{31}$ (piezoelectric strain coefficient) and low piezoelectric thickness. After allowing for a longitudinal clearance between the piezoelectric crystal and the mount plate of at least 0.005 inch, there is only 0.015 inch remaining for bonding the piezoelectric crystal to the load beam, and that is divided between the opposite ends of the crystal so there is only 0.0075 inch available for bonding at each end, and even less if the opening length is increased from 0.012 inch as is desirable. With so little bonding area and so much force on the bond, the invention provides a positive coupling between the load beam and piezoelectric crystal by having interfitting elements on these parts and also increasing the bonding area available by an increase in surface area by selective configuration and deflection of the components to get more bondable surface in the immediate vicinity of the connection. Broadly speaking, projecting and receiving elements are formed such as by forming 2, 4 or other number of projections on the load beam, such as rails, and inserting them into a corresponding number of receiving apertures in the piezoelectric crystal. The assembly is then bonded together with adhesive such as epoxy resin. The solidified epoxy resin or other bonding agent fills any gaps between the assembly inserting and receiving elements. The integrated piezoelectric crystal and load beam has a much higher efficiency in transfer of shear and tension forces between them. With the invention, higher transfer force efficiency is realized despite the limited bonding area presented by the opposed crystal and load beam surfaces.

With reference now to the drawings in detail, in FIGS. 1, 3A, 3B and 3C a first embodiment of the invention is depicted. In common with all the invention embodiments, the FIG. 1 embodiment includes for use in a disk drive a disk drive suspension 10 comprising a load beam 12 having a base portion 14, a spring portion 16, and a rigid, forwardmost beam portion 18. The beam portion 18 carries read-write head in a slider 22 in operating proximity to a disk (not shown). Suspension 10 includes left and right hand microactuators 24 comprising piezoelectric crystals 26. The piezoelectric crystals 26 are dimensionally variable electrodynamic devices that expand or contract with an input of a voltage. The piezoelectric crystals 26 define the microactuators 24. Microactuators 24 are positively coupled, as hereinafter described, to the load beam base portion 14 at their proximate end 28, and to the load beam rigid or beam portion 18 at their distal end 29, thereby spanning the load beam spring portion 16. In general, an increase in length of one of the microactuators 24 will shift the beam portion 18 left or right and thus move slider 22 laterally relative to the drive disk (not shown) effecting a transition across one or more tracks on the disk. Obviously, the bond between the microactuators 24 and the opposing portions 14, 18 of the load beam 12 is critical since no push or pull can be had if the bond fails. Nonetheless, as previously noted, the bond area is very small and loads must be distributed over very little adhesive.

The invention, therefore, provides a positive coupling between the load beam portions 14, 18 and the microactuators 24. In the FIG. 1 embodiment, for example, the positive coupling takes the form of a series of notches 32 arranged at substantially the corners of the piezoelectric crystal 26, and an interfitting series of tab elements or rails 34 formed by bending the load beam portions 14, 18 at locations substantially opposite the notches during formation of the load beam. Thus coupled, the microactuator will act through the interfitting notch and rail structures to selectively displace the beam portion relative to the base portion.

Figure 3A:
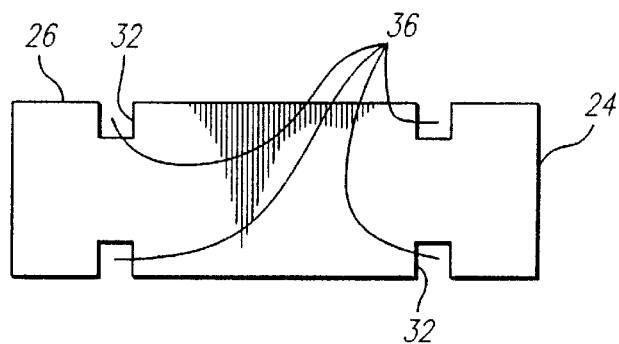
FIG. 3A is a plan view of a piezoelectric crystal modified for use in the first embodiment invention.
Figure 3B:
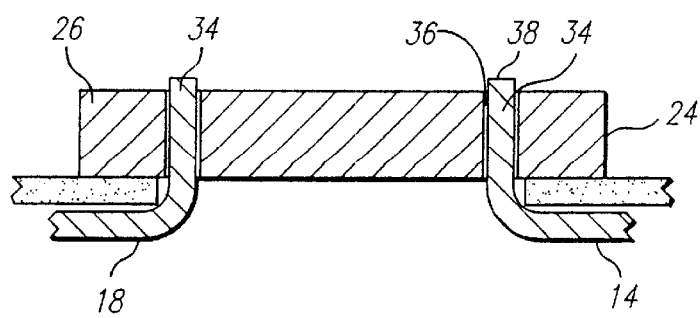
FIG. 3B is a view in section of the assembled load beam and piezoelectric crystal in the first embodiment of the invention.
Figure 3C:
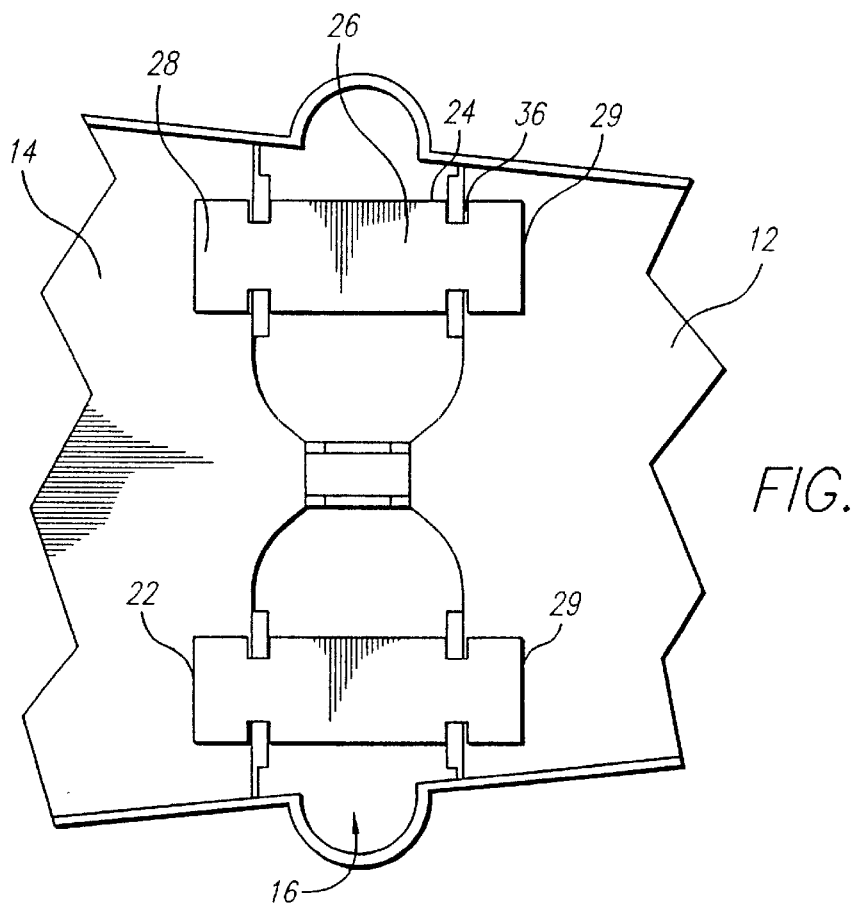
FIG. 3C is a fragmentary detail view of the first embodiment of the invention.
Figure 4A:
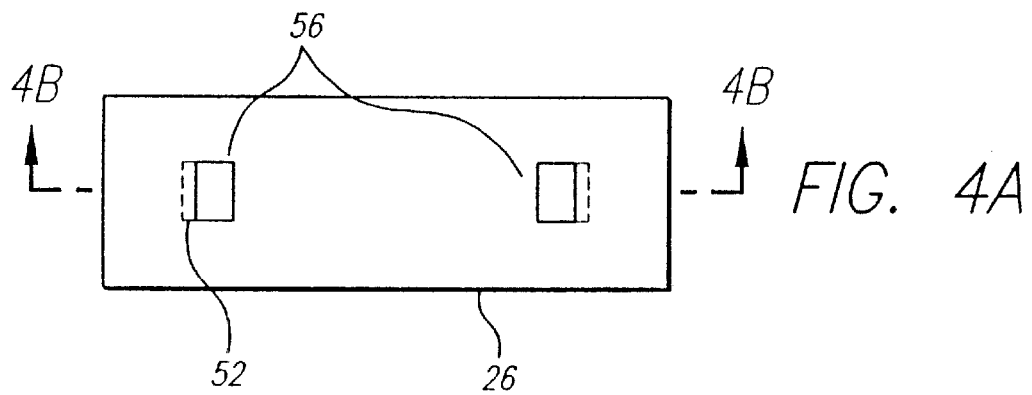
FIG. 4A is a plan view of a piezoelectric crystal modified for use in a second embodiment of the invention.
Figure 4B:
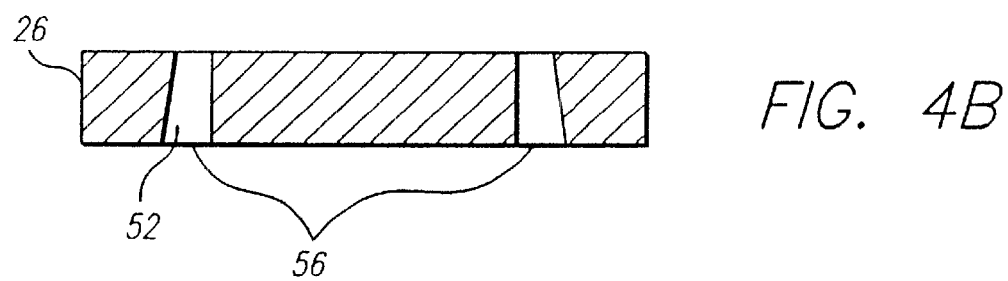
FIG. 4B is a view taken on line 4B—4B in FIG. 4A.
Figure 4C:
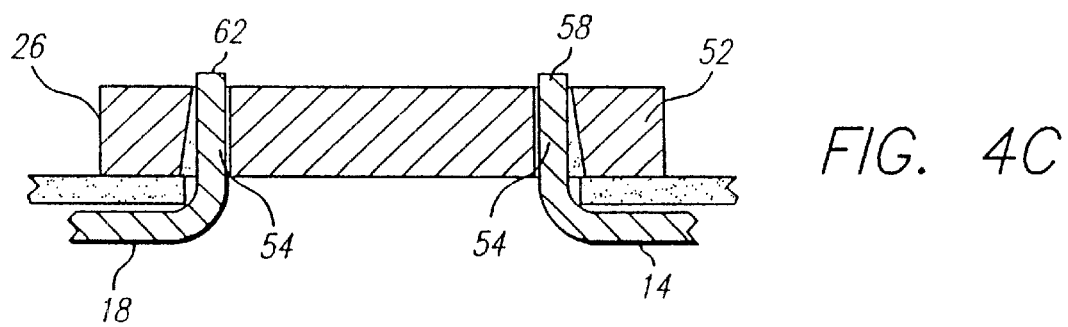
FIG. 4C is a view in section of the second embodiment of the invention.
Figure 4D:
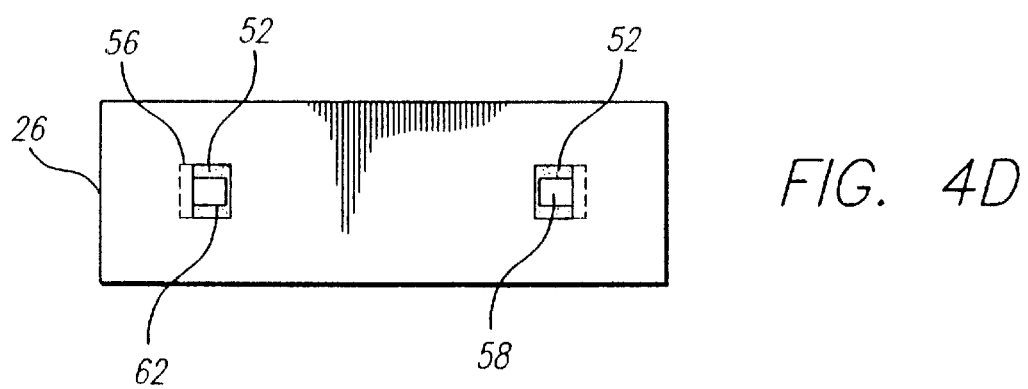
FIG. 4D is a fragmentary detail plan view of the second embodiment of the invention.

The notches 32 and rails 34 are typical of a variety of interfitting elements useful in the invention. In general, in all embodiments piezoelectric crystal 26 extends in a plane and defines an interfitting structure comprising at least receiving element, such as notch 32. The load beam also extends in a plane generally parallel to the plane of the piezoelectric crystal 26 and defines its own interfitting structure comprising at least one insertion element, such as the rail 34. As shown in FIGS. 3A–3C, the receiving and insertion elements 32, 34 cooperate in interfitting relation to interlock the piezoelectric crystal 26 and the load beam 12 in shear in their planes so that the right and left hand microactuators 24 act from the base portion 14 on the beam portion 18 in displacing relation correlated with a desired movement of the slider 22.

In the first embodiment the microactuator 24 comprises the piezoelectric crystal 26. The piezoelectric crystal 26 has female interfitting structures 36 formed therein in the shape of four notches 32 in proximate and distal pairs extending inward from the respective longitudinal edges of the crystal. The load beam base portion 14 defines first male structures 38 interfitting the proximately located pairs of notches 32. The load beam rigid portion 18 defines second male structures 42 to interfit with the distally located pairs of notches 32. Notches 32 are generally rectangular in longitudinal cross-section and extend transverse to the long axis of the piezoelectric crystal 26. The first and second male structures 38, 42 are generally congruent with the notches, and comprise bent up tabs or rails 34 from their respective load beam portions 14, 18. The first and second male structures 38, 42 extend transversely of their respective load beam portions 14, 18 and in parallel with each other, typically, as shown, extending transversely an extent greater than the transverse extent of the notches 32 so that the male structures project laterally from the piezoelectric crystal notches in their interfitted condition.

Once assembled, the interfitted male and female structures 38, 42, 36 are bonded together with a suitable bonding agent such as epoxy resin that is flowed into the crevices, if any, between the structures and allowed to cure and harden, not only bonding the parts together but ensuring an immediately positive engagement of the interfitted surfaces by filling all gaps between the parts.

With reference to FIGS. 2 and 4A–4D, a second embodiment of the invention is shown in which the female structures may be considered notches that are closed so as to be apertures. As in the first embodiment, each microactuator 24 comprises a piezoelectric crystal 26. Each piezoelectric crystal 26 has a series of apertures 52 formed at substantially the corners of the crystals inward from a longitudinal edge and at longitudinally spaced proximate and distal locations along the length of the crystal to define the female structures 56. The load beam base portion 14 defines first male structure 58 interfitting the proximately located aperture 52; the load beam rigid portion 18 defines second male structure 62 interfitting the distally located aperture 52. The microactuator piezoelectric crystal 26 has apertures 52 formed therein to define the female structure 56 in the form of the mentioned apertures 52, The apertures 52 are generally rectangular and oriented transverse to the long axis of the piezoelectric crystal 26, The first and second male structures 58, 62 are generally congruent with the apertures 52 and comprise bent up tabs or rails 54 from their respective load beam portions 14, 18. In this second embodiment, the apertures 52 are formed to have an inward taper to be smaller at the end remote to the insertion of the tab or rail 54, thus wedging the rail 54 into engagement with the aperture wall 55. See FIGS. 4B and 4C, particularly. As in the previous embodiment, the interfitted parts are bonded together with epoxy or other bonding adhesive.

In a third embodiment, the female structures take the form of rounded holes and the male structures the form of vertical elements extending from the load beam portions, formed by deflection, bending or etching. With reference to FIGS. 5A–5D, in the third embodiment the microactuator 24 comprises a piezoelectric crystal 26, the piezoelectric crystal having generally rounded holes 72 approximately centrally of its edges at longitudinally spaced proximate and distal locations to define the female structure 76. The load beam base portion 14 defines first male structure 78 interfitting the proximately located hole 76. The load beam rigid portion 18 defines a second male structure 82 interfitting the distally located hole 76. This embodiment offers the benefit of fewer holes being formed in the piezoelectric crystal 26, and fewer male elements as well. As in the other embodiments, the interfitted parts are bonded with adhesive.

Figure 5A:
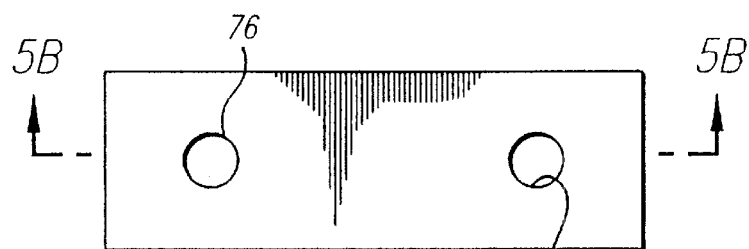
FIG. 5A is a plan view of a piezoelectric crystal modified for use in a third embodiment of the invention.
Figure 5B:
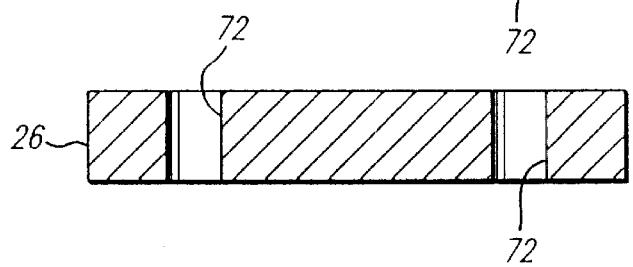
FIG. 5B is a view taken on line 4B—4B in FIG. 4A.
Figure 5C:
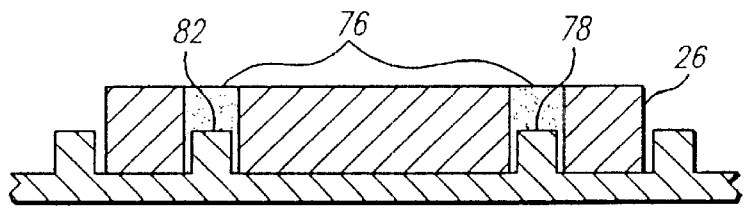
FIG. 5C is a view in section of the third embodiment of the invention.
Figure 5D:
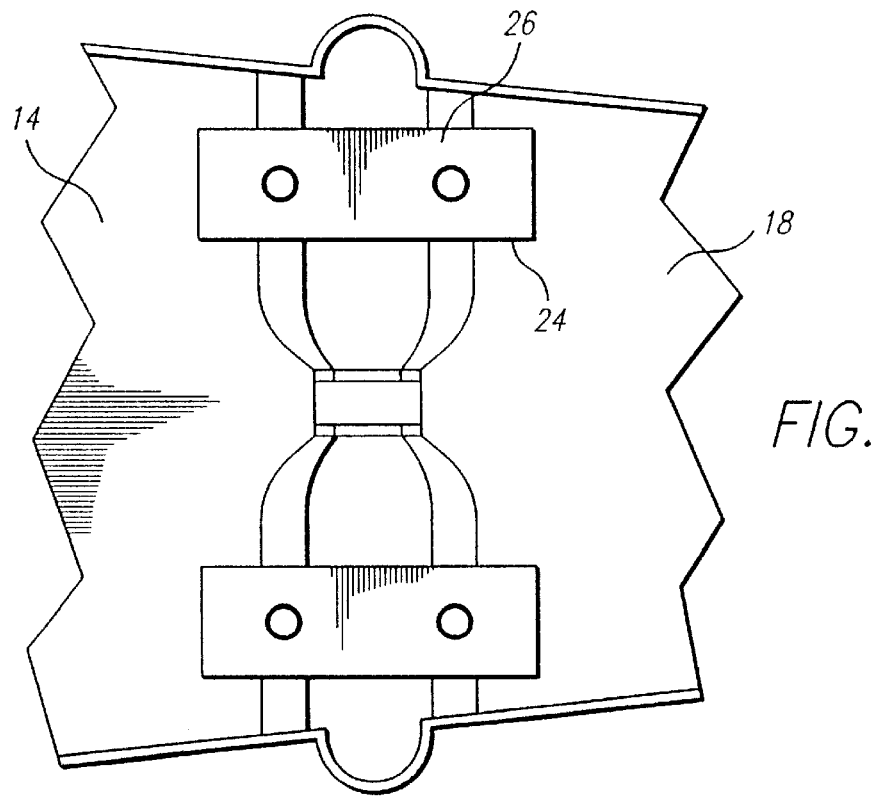
FIG. 5D is a fragmentary detail plan view of the third embodiment of the invention.
Figure 6A:
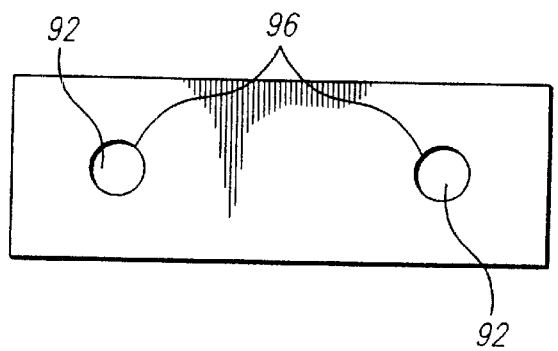
FIG. 6A is a plan view of a piezoelectric crystal modified for use in a fourth embodiment of the invention.
Figure 6B:
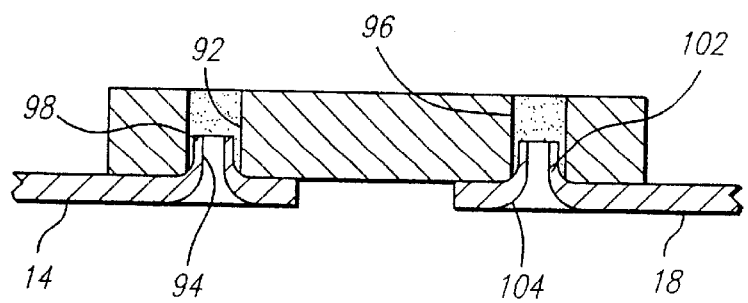
FIG. 6B is a view in section of the fourth embodiment of the invention.
Figure 6C:
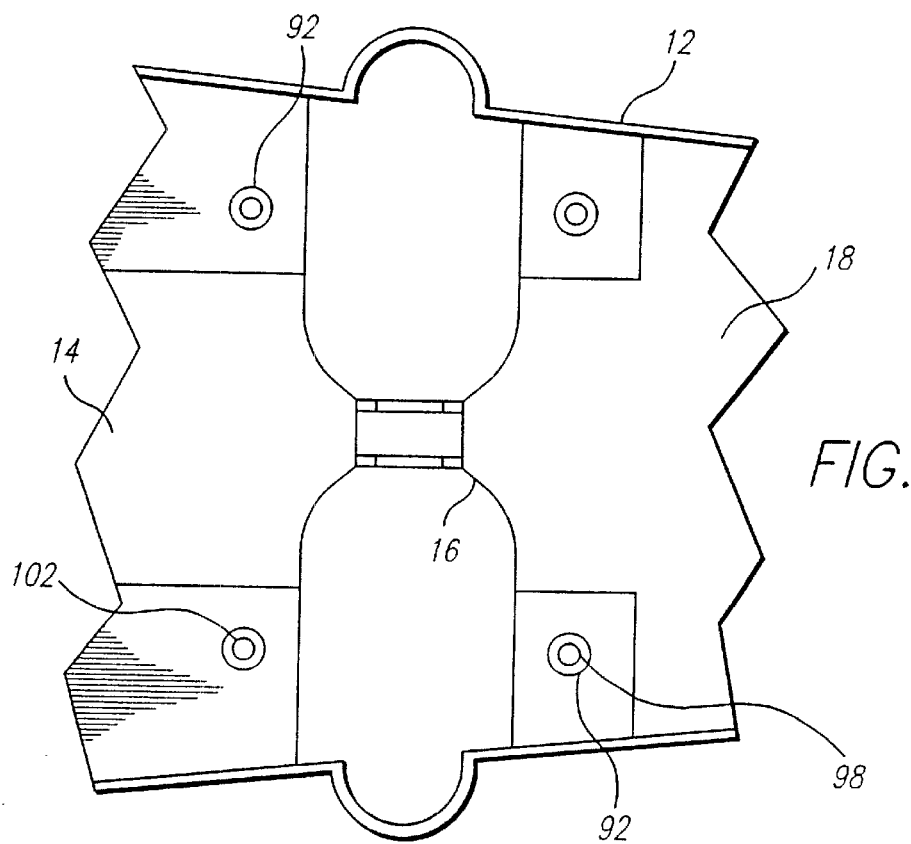
FIG. 6C is a fragmentary detail plan view of the fourth embodiment f the invention.

In a fourth embodiment, the females structure are essentially as in FIGS. 5A–5C, but the male structures are vertical elements such as conical, cylindrical bored bosses formed by upsetting the load beam portions with a suitable tool. With reference to FIGS. 6A–6C, in a fourth embodiment of the invention the microactuator 24 comprises a piezoelectric crystal 26. The piezoelectric crystal 26 has generally rounded first and second holes 92 on its longitudinal axis at longitudinally spaced, opposed proximate and distal locations to define the female structure 96. The load beam base portion 14 defines first male structure 98 interfitting the proximately located first hole 92. The load beam rigid portion 18 defines second male structure 102 longitudinally spaced from the first male structure 98 and interfitting the distally located hole 92. Holes 92 are circular; the first and second male structures 98, 102 each comprise conical, cylindrically bored bosses 94 having a generally conical base 104 generally congruent with its registered hole 92 in hole engaging relation to couple the piezoelectric crystal 26 to the load beam portions 14, 18. The first and second male structures 98, 102 comprise upsets or projections defining bosses 94 from their respective load beam portions 14, 18 and extend in parallel with each other and normal to the plane of their respective load beam portions. Bosses 94 have an axial extent less than the axial extent of the holes 92 in their interfitted condition. Bosses 94 can be formed by etching away load beam portion areas surrounding the projections, or preferably are formed by deflecting or upsetting the load beam portions 14, 18 with a forming tool. As in other embodiments the interfitted parts in the fourth embodiment are bonded with epoxy resin or other suitable adhesive.

The invention method thus includes reshaping a piezoelectric crystal surface to have a notch, aperture or hole to increase its area opposite the load beam, reshaping the load beam opposing surface to increase its area by forming projections thereon, applying adhesive to at least one of the opposing surfaces, and bonding the opposing surfaces together with the adhesive.

The invention thus provides an improved assembly of a load beam and microactuator by positively coupling them together by interfitting elements of the load beam and microactuator, increasing the opposing surfaces of the parts and bonding the parts with adhesive, and more specifically providing interfitting receiving and inserting structures on the microactuator and load beam such as notches, apertures, and holes that positively couple corresponding structure such as tabs, rails, pins, bosses and the like. The foregoing objects are thus met.

I claim:

1. A disk drive suspension comprising a load beam having a base portion and a beam portion adapted to carry a slider in operating proximity to a disk, and a dimensionally variable electrodynamic microactuator having thickness and a perimeter, said load beam having a part extending into said microactuator perimeter, said microactuator acting through said part to selectively displace said beam portion relative to said base portion.

2. The disk drive suspension according to claim 1, in which said load beam and microactuator are bonded together.

3. The disk drive suspension according to claim 1, in which said microactuator comprises a piezoelectric crystal.

4. The disk drive suspension according to claim 1, in which said suspension includes right and left hand microactuators acting from said base portion on said beam portion in displacing relation.

5. A disk drive suspension comprising a load beam having a base portion and a beam portion adapted to carry a slider in operating proximity to a disk, and a dimensionally variable electrodynamic microactuator having thickness and a perimeter, said load beam having a part extending into said microactuator perimeter, said microactuator acting through said part to selectively displace said beam portion relative to said base portion, said microactuator comprising a piezoelectric crystal, said crystal extending in a plane, said load beam extending in a plane generally parallel to said crystal plane, said load beam part locking said crystal and said load beam in shear.

6. A disk drive suspension comprising a load beam having a base portion and a beam portion adapted to carry a slider in operating proximity to a disk, and a dimensionally variable electrodynamic microactuator having thickness and a perimeter, said load beam having a part extending into said microactuator perimeter, said microactuator acting through said part to selectively displace said beam portion relative to said base portion, said microactuator comprising a piezoelectric crystal, said crystal extending in a plane, said load beam extending in a plane generally parallel to said crystal plane, said load beam part locking said crystal and said load beam in shear, said load beam and microactuator being bonded together.

7. The disk drive suspension according to claim 6, in which said suspension includes right and left hand microactuators acting from said base portion on said beam portion in displacing relation.

8. A disk drive suspension comprising a load beam having a base portion and a beam portion adapted to carry a slider in operating proximity to a disk, and a dimensionally variable electrodynamic microactuator having a thickness and a perimeter, first and second load beam parts within said microactuator thickness and perimeter, said microactuator acting through said first and second parts to selectively displace said beam portion relative to said base portion.

9. A disk drive suspension comprising a load beam having a base portion and a beam portion adapted to carry a slider in operating proximity to a disk, and a dimensionally variable electrodynamic microactuator having a thickness and a perimeter, first and second load beam parts within said microactuator thickness and perimeter, said microactuator acting through said first and second parts to selectively displace said beam portion relative to said base portion, said microactuator comprising a piezoelectric crystal, said crystal extending in a plane, said load beam extending in a plane generally parallel to said crystal plane, said load beam part locking said crystal and said load beam in shear.

10. The disk drive suspension according to claim 9, in which said suspension includes right and left hand microactuators acting from said base portion on said beam portion in displacing relation.

11. A method of bonding a load beam and a microactuator having a thickness and a perimeter, said load beam and said microactuator having opposing surfaces including a projecting load beam part, including increasing the surface of said microactuator within its said thickness and perimeter and opposite said load beam projecting part to increase its surface area, and bonding said load beam projecting part to said increased surface of said microactuator within said microactuator thickness and perimeter.

\* \* \* \* \*